United States Patent [19]
Hardouin

[11] Patent Number: 6,049,700
[45] Date of Patent: Apr. 11, 2000

[54] AUTOMATIC VOLUME ADJUSTMENT IN A WIRELESS HANDSET

[75] Inventor: Larry J. Hardouin, Westminister, Colo.

[73] Assignee: Lucent Technologies Inc., Murray Hill, N.J.

[21] Appl. No.: 08/845,977

[22] Filed: Apr. 30, 1997

[51] Int. Cl.[7] .................................................. H04B 7/00
[52] U.S. Cl. ........................ 455/69; 455/127; 455/238.1
[58] Field of Search .............................. 455/69, 127, 126, 455/234.1, 238.1, 355, 456, 517, 421

[56] References Cited

U.S. PATENT DOCUMENTS

| | | | |
|---|---|---|---|
| 4,928,306 | 5/1990 | Biswas et al. | 379/201 |
| 5,170,499 | 12/1992 | Grothause | 455/238.1 |
| 5,467,055 | 11/1995 | Wray et al. | 455/126 |
| 5,574,993 | 11/1996 | Kobayashi et al. | 455/126 |
| 5,822,702 | 10/1998 | Kobayashi | 455/355 |

FOREIGN PATENT DOCUMENTS

| | | | |
|---|---|---|---|
| 3159347 | 7/1991 | Japan | H04M 1/274 |
| 6244919 | 9/1994 | Japan | H04M 1/60 |
| 2280327 | 1/1995 | United Kingdom | G01S 5/14 |
| 9609969 | 5/1996 | United Kingdom | H04Q 7/38 |
| 9615614 | 5/1996 | WIPO | H04M 11/00 |
| WO 97/08884 | 3/1997 | WIPO | H04M 15/00 |

OTHER PUBLICATIONS

Weiss, K. et al., Conventional Local Area Radio Coverage System:, Motorola Technical Developments, vol. 13, Jul. 1, 1991, pp. 67–69.

*Primary Examiner*—Reinhard J. Eisenzopf
*Assistant Examiner*—Sam Bhattacharya
*Attorney, Agent, or Firm*—John C. Moran

[57] ABSTRACT

Determining in a wireless telecommunication switching system a base station on which a wireless handset is registered and using information concerning background noise at the location of the base station to automatically adjust the ringer and voice volumes for each call received by the wireless handset while registered on that base station. Further, the wireless telecommunication switching system automatically adjusts the voice volume when a call is handed off from one base station to another base station. Each base station may automatically determine the amount of background noise and transmits this information to the wireless telecommunication system controller which stores this information for future use. Also, each time a user of a wireless handset adjusts the volume of the handset, this information may be transmitted to the wireless communication switching system controller which stores the information as a preference for the user in the area served by that particular base station. In addition, the system administrator may determine the background noise for each base station and does so for different times of day. Finally, the system administrator may determine the noise level for the different areas of the building and as base stations are added to the wireless telecommunication system, they inherit the attributes of the area where they are placed.

16 Claims, 8 Drawing Sheets

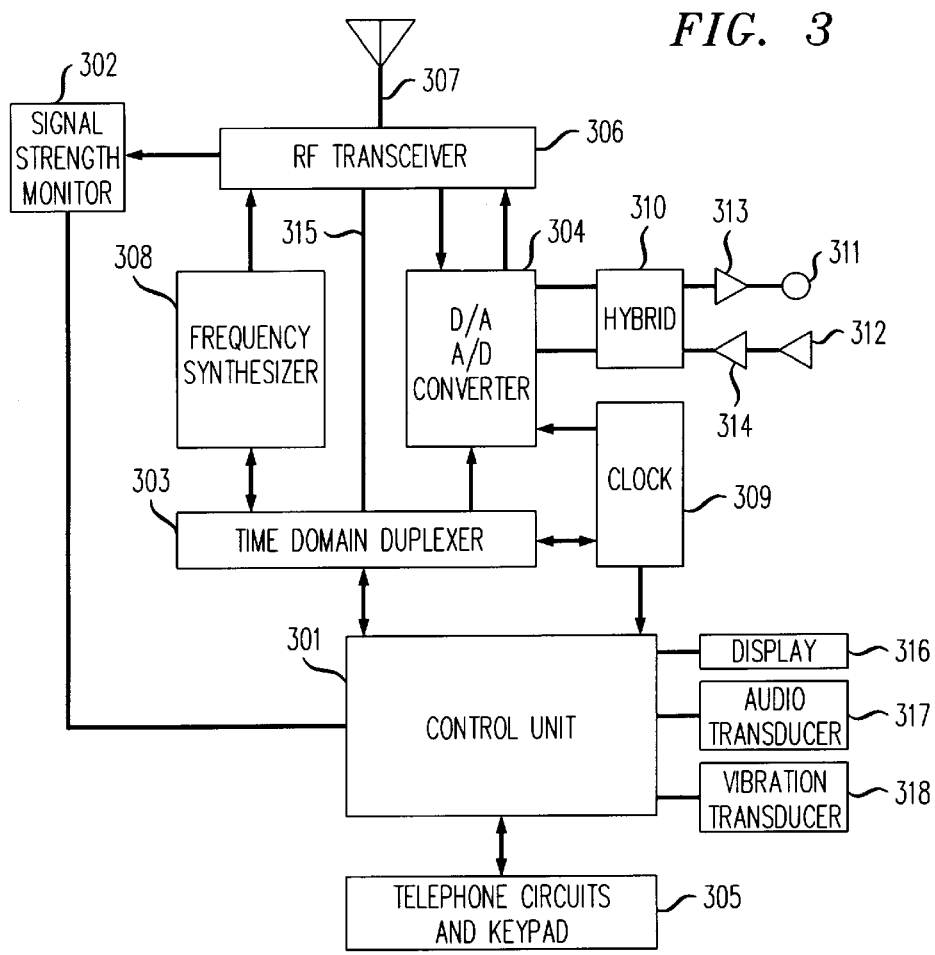

| | WIRELESS HANDSET 111 TABLE 2 | | | |
|---|---|---|---|---|
| | BASE STATION NUMBER | RINGER VOLUME | AUDIO OUT VOLUME | AUDIO IN VOLUME |
| 601 | 101 | 18 | 12 | 10 |
| 602 | 102 | 16 | 11 | 9 |
| 603 | 103 | 15 | 10 | 6 |
| 604 | 104 | 6 | 4 | 2 |
| 606 | 106 | 5 | 3 | 3 |
| 607 | 107 | 6 | 6 | 4 |
| 608 | 109 | 6 | 4 | 3 |

FIG. 9

| BASE STATION NUMBER | SYSTEM LEVEL TABLE 3 ||||||||| 
|---|---|---|---|---|---|---|---|---|---|
| | RINGER VOLUME ||| AUDIO OUT VOLUME ||| AUDIO IN VOLUME |||
| | 1ST | 2ND | 3RD | 1ST | 2ND | 3RD | 1ST | 2ND | 3RD |
| 101 | 15 | 15 | 15 | 10 | 10 | 10 | 6 | 6 | 6 |
| 102 | 18 | 18 | 18 | 12 | 12 | 12 | 10 | 10 | 10 |
| 103 | 16 | 16 | 16 | 11 | 11 | 11 | 9 | 9 | 9 |
| 104 | 5 | 10 | 10 | 3 | 5 | 5 | 2 | 4 | 4 |
| 106 | 6 | 12 | 12 | 4 | 6 | 6 | 3 | 3 | 3 |
| 107 | 2 | 16 | 16 | 2 | 11 | 11 | 1 | 9 | 9 |
| 109 | 6 | 15 | 15 | 4 | 10 | 10 | 3 | 12 | 12 |
| | | | | | | | | | |

FIG. 10

| AREA COORDINATES | GEOGRAPHICAL TABLE 4 |||||||||
|---|---|---|---|---|---|---|---|---|---|
| | RINGER VOLUME ||| AUDIO OUT VOLUME ||| AUDIO IN VOLUME |||
| | 1ST | 2ND | 3RD | 1ST | 2ND | 3RD | 1ST | 2ND | 3RD |
| (0,0) (50,0) (50,50) (0,33) | 15 | 15 | 15 | 10 | 10 | 10 | 6 | 6 | 6 |
| (50,0) (100,0) (100,20) (50,50) | 18 | 18 | 18 | 12 | 12 | 12 | 10 | 10 | 10 |
| (100,20) (100,100) (20,100) (50,50) | 16 | 16 | 16 | 11 | 11 | 11 | 9 | 9 | 9 |
| (0,33) (50,50) (20,100) (0,100) | 5 | 10 | 10 | 3 | 5 | 5 | 2 | 4 | 4 |
| | | | | | | | | | |

AUTOMATIC VOLUME ADJUSTMENT IN A WIRELESS HANDSET

CROSS-REFERENCE TO RELATED APPLICATIONS

L. J. Hardouin, "Automatic Determination of Audio or Vibration Alerting for an Incoming Call in a Wireless Handset"; and L. J. Hardouin, "Geographical Determination of Wireless Operations".

These applications are filed concurrently with this application and are assigned to the same assignee.

TECHNICAL FIELD

This invention relates to wireless telecommunication switching systems and wireless handsets.

BACKGROUND OF THE INVENTION

A problem that faces the users of wireless handsets is coping with ambient or background noise as they change their physical location. Different physical locations can have varying amounts of background noise. For example, if a user is in a conference room, the user will turn down the ringing volume and the volume of both transmitted and received speech on the wireless handset. When the user leaves the conference room and moves to a manufacturing area, the user may miss calls because they will not hear the ringing. If the user does receive a call, the user then has to adjust the volume controls. This problem is particularly severe for the users of personal communication service (PCS) wireless handsets because PCS wireless handsets are used in confined surroundings where the noise can vary a great deal.

SUMMARY OF THE INVENTION

This invention is directed to solving this problem and other disadvantages of the prior art. In accordance with the invention, a wireless telecommunication switching system determines the base station on which a wireless handset is registered and uses information concerning background noise at the location of the base station to automatically adjust the ringer and voice volumes for each call received by the wireless handset while registered on that base station. Further, the wireless telecommunication switching system automatically adjusts the voice volume when a call is handed off from one base station to another base station. In a first embodiment, each base station automatically determines the amount of background noise and transmits this information to the wireless telecommunication system controller which stores this information for future use. In a second embodiment, each time a user of a wireless handset adjusts the volume of the handset, this information is transmitted to the wireless communication switching system controller which stores the information as a preference for the user in the area served by that particular base station. In a third embodiment, the system administrator determines the background noise for each base station and does so for different times of day. In a fourth embodiment, the system administrator determines the noise level for the different areas of the building and as base stations are added to the wireless telecommunication system, they inherit the attributes of the area where they are placed.

Other and further aspects of the present invention will become apparent during the course of the following description and by reference to the accompanying drawing.

BRIEF DESCRIPTION OF THE DRAWING

FIG. 3 illustrates, in block diagram form, a wireless handset;

FIG. 4 illustrates a table utilized in the first embodiment of the invention;

FIG. 9 illustrates a table utilized in the third and fourth embodiments of the invention;

FIG. 10 illustrates a table utilized in the fourth embodiment of the invention;

DETAILED DESCRIPTION

Figure 1:
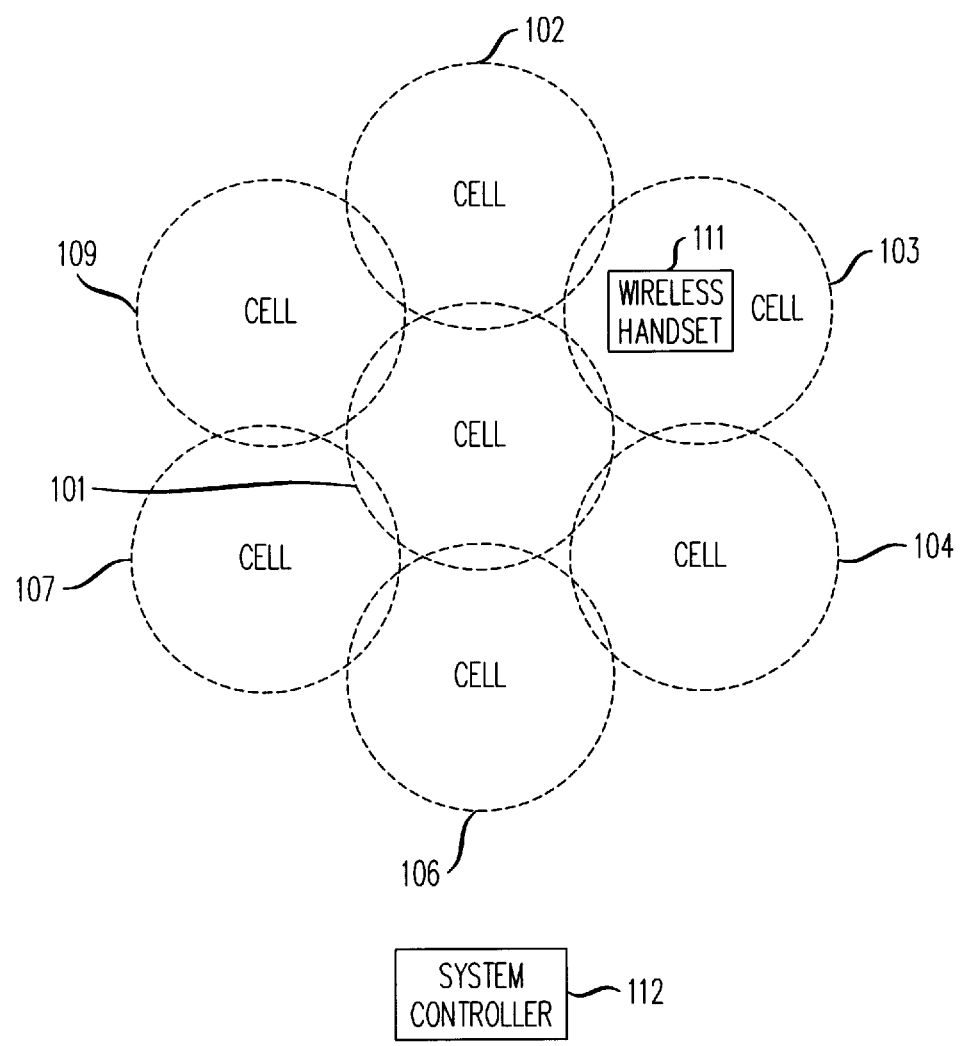
FIG. 1 illustrates a wireless telecommunication switching system embodying the inventive concept.

FIG. 1 illustrates a wireless telecommunication switching system having a plurality of wireless cells (also referred to as cell sites) which are cells 101–109. These plurality of cells are providing service for wireless handsets such as wireless handset 111. Each cell consists of a base station that is not illustrated in FIG. 1 but is illustrated in detail in FIG. 2. The cells illustrated in FIG. 1 are under control of system controller 112. The geographical area covered by the cells is illustrated as being a circle; however, one skilled in the art would immediately recognize that the geographical area covered by each cell could be of a different configuration. System controller 112 controls the operation of the cells by controlling the base stations via communication links that are not illustrated in FIG. 1.

To understand the operation of the wireless telecommunication switching system of FIG. 1, consider the following example. When wireless handset 111 moves from cell 101 to cell 103, system controller 112 exams an internal table that defines the noise level for each cell and transmits via the base station controlling cell 103 the ringer and audio volume information to wireless handset 111. System controller 112 becomes aware that wireless handset 111 has moved to cell 103 when wireless handset 111 registers on the base station controlling cell 103.

Figure 2:
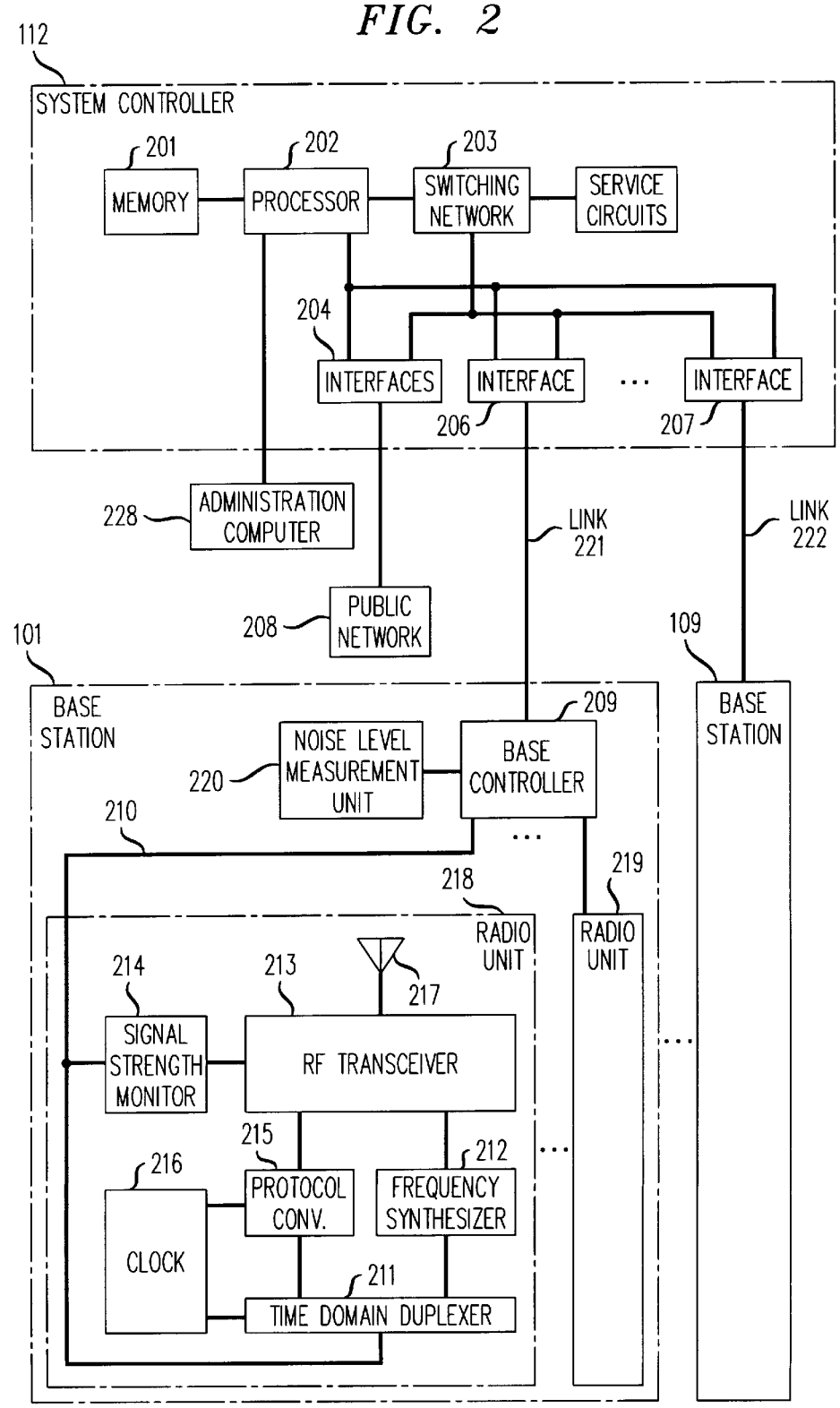
FIG. 2 illustrates, in block diagram form, the wireless telecommunication switching system of FIG. 1.

FIG. 2 illustrates, in block diagram form, the wireless telecommunication system illustrated in FIG. 1. System controller 112 is under the control of processor 202 which executes programs and utilizes data stored in memory 201. System controller 112 interfaces to public network 208 via interfaces 204. System controller 112 is interconnected to base stations 101–109 via links 221–222 which terminate on interfaces 206–207. The switching of audio and data received via interfaces 206–207 is performed by switching network 203 under control of processor 202. Base station 101 illustrates in greater detail the composition of a base station. Each base station comprises a plurality of radio units 218–219 that are under the control of base controller 209. Base controller 209 is responsive to the message requesting that a wireless handset's transmission signal strength be interrogated to adjust the frequency of RF transceiver 213 to the channel used by the wireless handset by controlling frequency synthesizer 212 via time domain duplexer 211 and bus 210. Signal strength monitor 214 reports the relative signal strength of the wireless handset to base controller 209 via bus 210. Base controller 209 utilizes noise level measurement unit 220 to determine the noise level of the environment of base station 101. Base controller 209 periodically reports the noise level to processor 202 via link 221 and interface 206. Advantageously, this report of noise is performed every 15 minutes.

Processor 202 is responsive to this noise level information from each of the base stations to store volume adjustment information in memory 201. This information is stored in Table 1 as illustrated in FIG. 4. When a wireless handset registers on a new base station, processor 202 accesses Table 1 of FIG. 4 to determine the adjustments to be made in the ringer and audio volumes of the handset.

Wireless handset 111 is illustrated in greater detail in FIG. 3. Other wireless handsets are identical in design. Wireless handset 111 is implementing a wireless protocol that allows wireless handset 111 to maintain a wireless signal link with system controller 112 via the base stations in the cells. One air interface that can be used is the Japanese PHS protocol as set forth in "User-Network Interface and Inter-Network Interface Standards for PHS", the Telecommunication Technology Committee, 1995, and "Personal Handy Phone System RCR Standard", Version 1, RCR STD-28, Dec. 20, 1993. The message set of the PHS protocol is similar to the ISDN message set. Overall control of the wireless handset is provided by control unit 301.

Units 302, 303, 306, 307, 308, and 309 provide the RF communication capabilities for the wireless handset. Elements 304, 310, and 311–314 provide the audio information received and transmitted to the user; whereas, elements 316–318 and 305 provide the basic user interface. Control unit 301 is responsive to ringer and audio volume control information received from a base station via elements 303, 306, and 307 to control amplifiers 313 and 314 to control the audio volumes and to control audio transducer 317 in accordance with the invention.

FIG. 4 illustrates System Level Table 1 that is maintained by processor 202 in memory 201. Table 1 specifies the ringer, audio out, and audio in volumes that are to be used for all base stations. The information inserted into lines 401–408 is received by processor 202 from each of the base stations on a periodic basis.

Figures 5, 6:
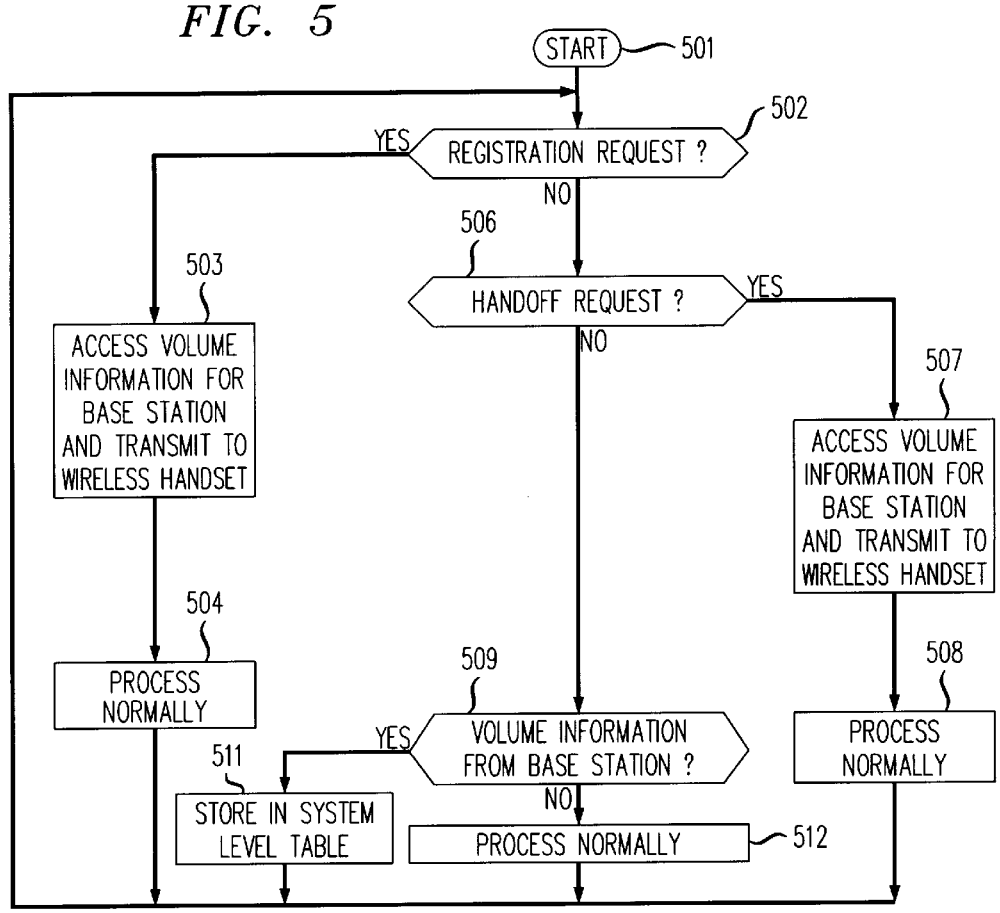
FIG. 5 illustrates, in flow chart form, the steps performed by a system controller in implementing the first embodiment of the invention.
FIG. 6 illustrates a table utilized in the second embodiment.

FIG. 5 illustrates in flowchart form the steps performed by processor 202 in the first embodiment. After starting at block 501, decision block 502 determines if a registration request has been received from a wireless handset. If a registration request has been received from a wireless handset, block 503 accesses System Level Table 1 of FIG. 4 and transmits the volume information to the registering wireless handset for the base station on which the registration is being performed. Block 504 then processes the registration request in a normal manner before returning control back to decision block 502.

If the answer in decision block 502 is no, control is transferred to decision block 506. The latter decision block determines if a handoff request has been received from a wireless handset. If the answer is yes, block 507 accesses System Level Table 1 of FIG. 4 and transmits the volume information to the wireless handset performing the handoff for the base station. Block 508 then processes the handoff request in a normal manner before returning control back to decision block 502.

If the answer in decision block 506 is no, decision block 509 determines if noise level information is being received from a base station. If the answer is yes, block 511 stores volume information based on this noise level information in System Level Table 1. If the answer in decision block 509 is no, decision block 509 transfers control to block 512 which processes the wireless handset in a normal manner.

Figure 7:
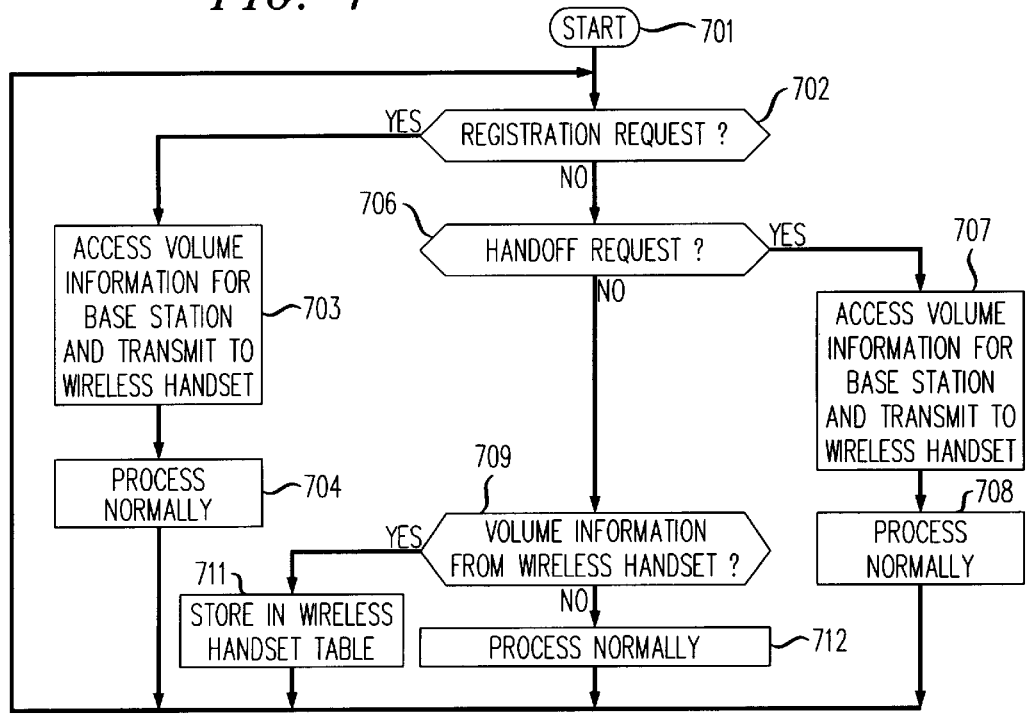
FIG. 7 illustrates, in flow chart form, the steps performed by a system controller in implementing the second embodiment of the invention.

FIG. 7 illustrates, in flowchart form, the steps performed by processor 202 in the second embodiment. After starting at block 701, decision block 702 determines if a registration request has been received from a wireless handset. If a registration request has been received from a wireless handset, block 703 accesses Wireless Handset 111 Table 2 of FIG. 6 and transmits the volume information to the registering wireless handset for the base station on which the registration is being performed. Block 704 then processes the registration request in a normal manner before returning control back to decision block 702.

If the answer in decision block 702 is no, control is transferred to decision block 706. The latter decision block determines if a handoff request has been received from a wireless handset. If the answer is yes, block 707 accesses Wireless Handset 111 Table 2 of FIG. 6 and transmits the volume information to the wireless handset performing the handoff for the base station. Block 708 then processes the handoff request in a normal manner before returning control back to decision block 702.

If the answer in decision block 706 is no, decision block 709 determines if volume information is being received from a wireless handset. If the answer is yes, block 711 stores the volume information in a wireless handset table such as Wireless Handset 111 Table 2 of FIG. 6 before transferring control back to decision block 702. If the answer in decision block 709 is no, decision block 709 transfers control to block 712 which processes the wireless handset in a normal manner.

Figure 8:
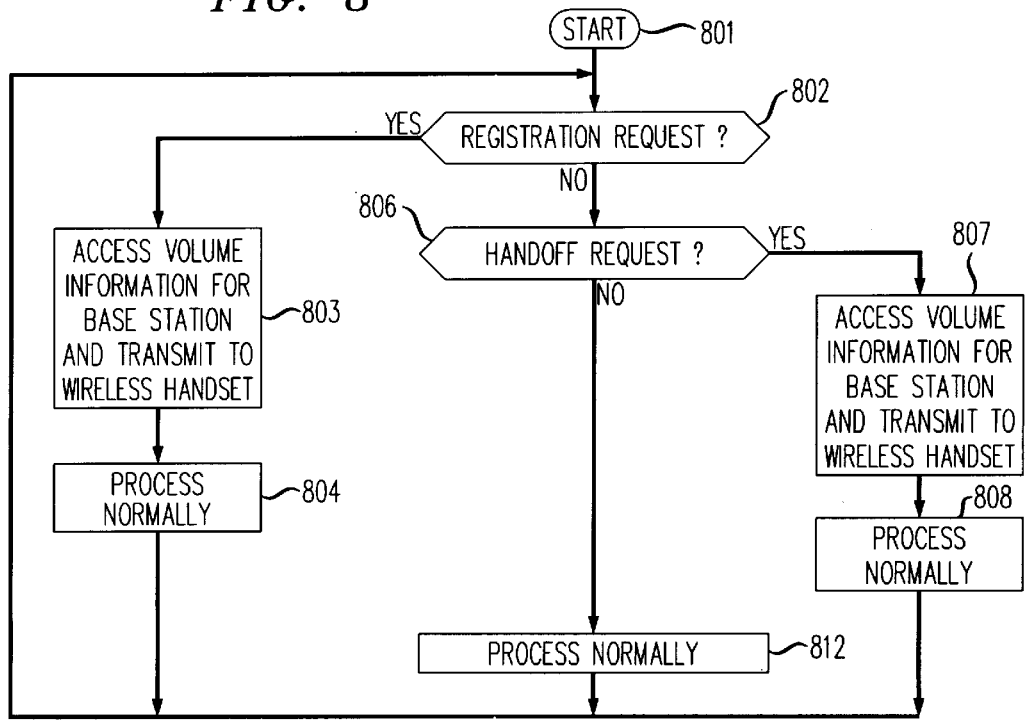
FIG. 8 illustrates, in flow chart form, the steps performed by a system controller in implementing the third and fourth embodiments of the invention.

FIG. 8 illustrates, in flowchart form, the steps performed by processor 202 in the third and fourth embodiments. After starting at block 801, decision block 802 determines if a registration request has been received from a wireless handset. If a registration request has been received from a wireless handset, block 803 accesses System Level Table 3 of FIG. 9 and transmits the volume information to the registering wireless handset for the base station on which the registration is being performed. System Level Table 3 is maintained by the system administrator who designates volume levels for each shift of the day using administration computer 228. Block 804 then processes the registration request in a normal manner before returning control back to decision block 802.

If the answer in decision block 802 is no, control is transferred to decision block 806. The latter decision block determines if a handoff request has been received from a wireless handset. If the answer is yes, block 807 accesses System Level Table 3 of FIG. 9 and transmits the volume information to the wireless handset performing the handoff for the base station. Block 808 then processes the handoff request in a normal manner before returning control back to decision block 802.

If the answer in decision block 806 is no, decision block 806 transfers control to block 812 which processes the wireless handset in a normal manner before returning control back to decision block 802.

Figure 11:
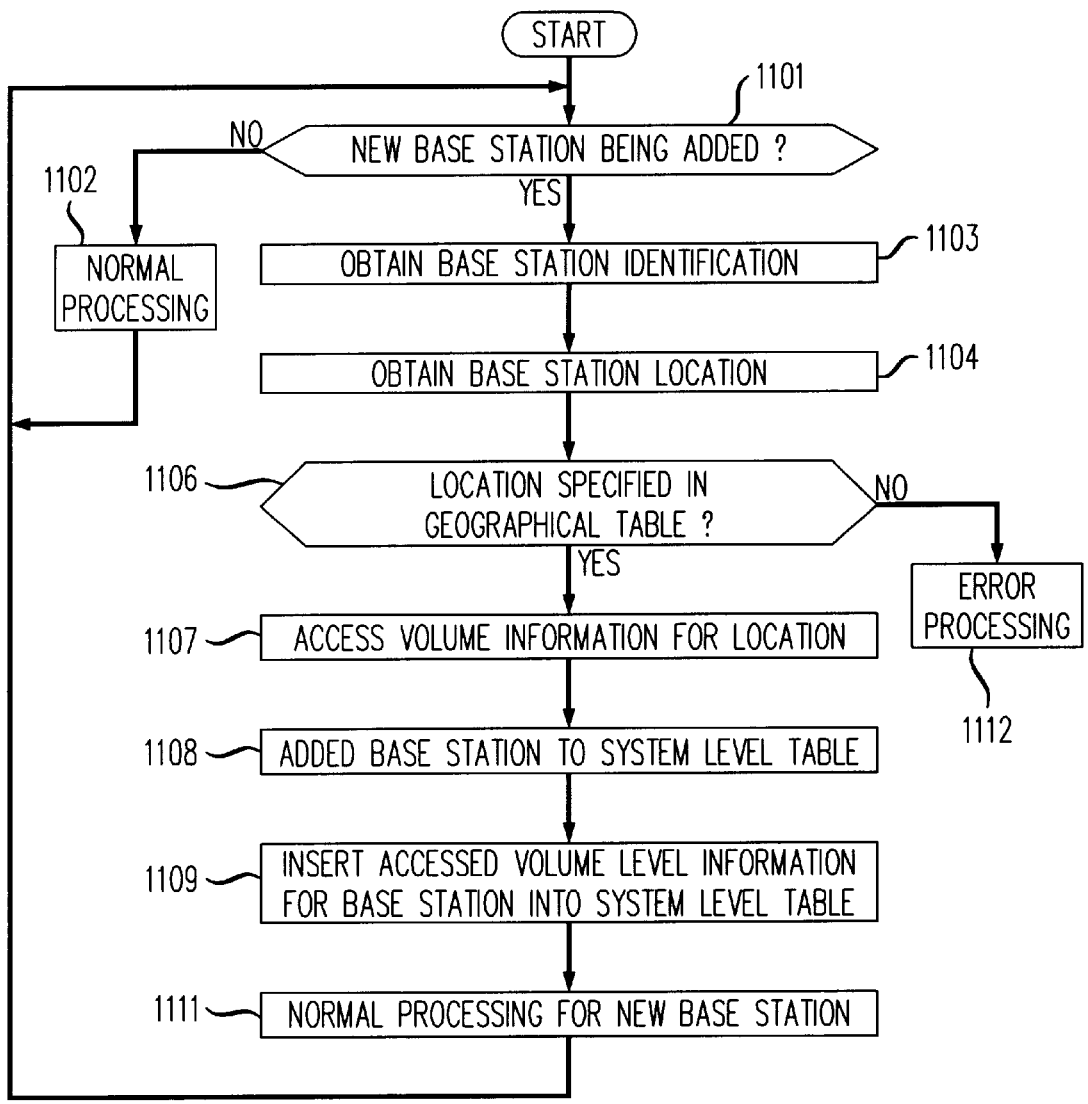
FIG. 11 illustrates, in flow chart form, the steps performed by an administration computer in implementing the fourth embodiment of the invention.
Figure 12:
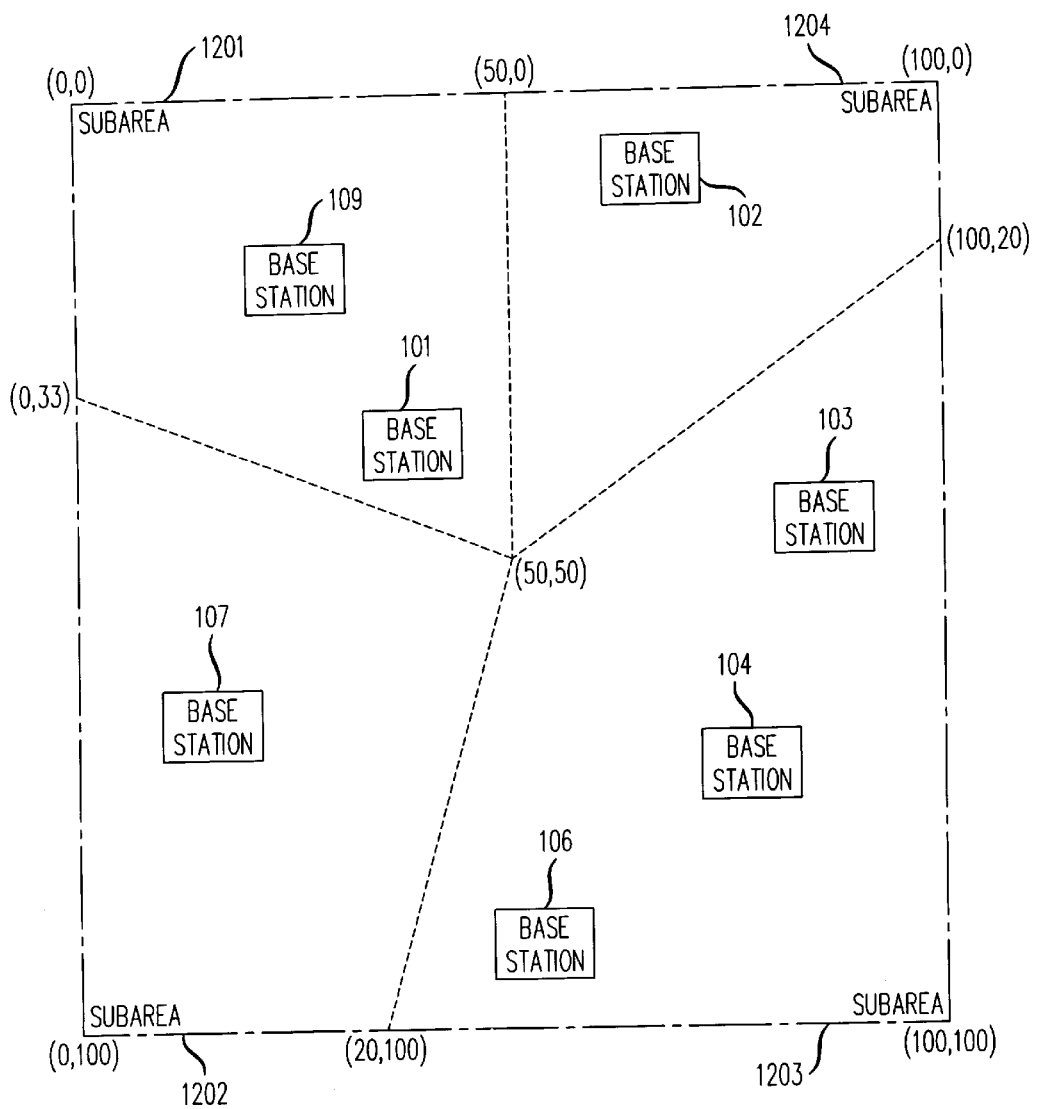
FIG. 12 illustrates an area for which a wireless telecommunication switching system is providing service being divided into sub-areas for implementing the fourth embodiment of the invention.

FIG. 10 illustrates Geographical Table 4 which is maintained by administration computer 228 of FIG. 2. The area coordinates used in FIG. 10 are defined by FIG. 12. FIG. 11 illustrates the steps performed by administration computer 228 when a new base station is added to the wireless telecommunication switching system illustrated in FIG. 2. Decision block 1101 determines if a new base station is being added. If the answer is no, block 1102 performs normal processing before returning control back to decision block 1101. If the answer is yes in decision block 1101, block 1103 obtains the base station identification from the system administrator, and block 1104 obtains the location at which the new base station is to be installed. Decision block 1106 then accesses Geographical Table 4 of FIG. 10 to determine if the location of the new base station is specified in this table. If the answer is no, block 1112 performs error processing. If the answer is yes, block 1107 accesses Geographical Table 4 to obtain the volume information for the new base station. Block 1108 then adds the new base station into System Level Table 3 of FIG. 9. Block 1109 then inserts the accessed volume information from Geographical Table 4 into the row provided in System Level Table 3 for the new base station. Block 1111 performs the normal processing for a new base station before returning control back to decision block 1101.

It is to be understood that the above-described embodiments are merely illustrative of the principles of the invention and that other arrangements may be devised by those skilled in the art without departing from the spirit and scope of the invention. In particular, it would be apparent to one skilled in the art that the volumes of the ringer and audio circuits could be automatically adjusted to compensate for factors other than environmental noise.

What is claimed is:

1. A method of adjusting audio volume levels in a wireless handset by a wireless telecommunication switching system under control of a system controller providing wireless telecommunication service for a plurality of wireless handsets via a plurality of base stations, comprising the steps of:

detecting by the system controller a change of a base station by one of the plurality of wireless handsets; and transmitting by the system controller adjustment information specifying audio volume levels for the one of the plurality of wireless handsets in response to the detection of the base station change.

2. The method of claim 1 further comprises the step of storing by the system controller in a first table individual adjustment information for each of the plurality of base stations.

3. The method of claim 2 further comprises the steps of receiving by the system controller user specified adjustment information for each of the plurality of base stations transmitted by the one of the plurality of wireless handsets; and storing by the system controller in second table the user specified adjustment information for each of the plurality of base stations.

4. The method of claim 3 wherein the individual adjustment information may not specify audio volume levels; and selecting the user adjustment information for the one of the plurality of wireless handsets upon the individual adjustment information not specifying audio volume levels for one of the plurality of base stations on which the one of the plurality of wireless handsets is located.

5. The method of claim 4 wherein the individual adjustment information stored in the first table is directly specified for each of the plurality of base stations by the system administrator.

6. The method of claim 4 further comprises the steps of specifying adjustment information for individual geographical areas in a third table;

specifying the geographical area in which each of the plurality of base stations is located; and determining the individual adjustment information to be stored in the first table for each of the plurality of base stations by selecting adjustment information from the third table using the specified geographical area for each of the plurality of base stations.

7. The method of claim 4 wherein the audio volume levels include alerting signals.

8. The method of claim 7 wherein the audio volume levels include transmitted and received voice signals.

9. An apparatus that implements the steps of claim 1.
10. An apparatus that implements the steps of claim 2.
11. An apparatus that implements the steps of claim 3.
12. An apparatus that implements the steps of claim 4.
13. An apparatus that implements the steps of claim 5.
14. An apparatus that implements the steps of claim 6.
15. An apparatus that implements the steps of claim 7.
16. An apparatus that implements the steps of claim 8.

* * * * *